May 11, 1948. L. J. FULLER 2,441,222
EXTRUDER
Filed Oct. 19, 1943 3 Sheets-Sheet 2
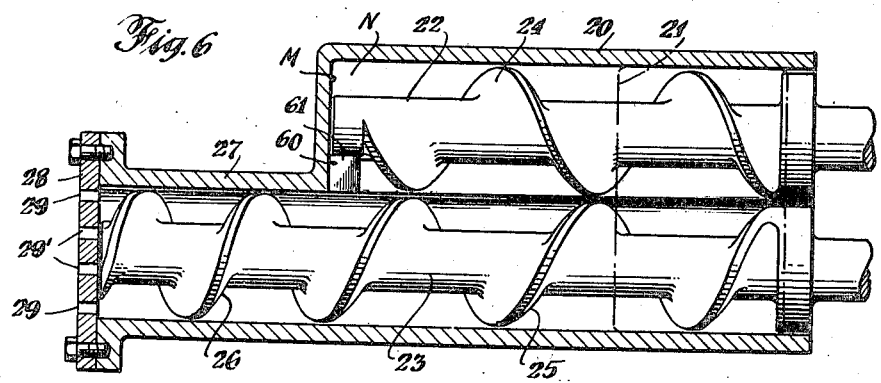
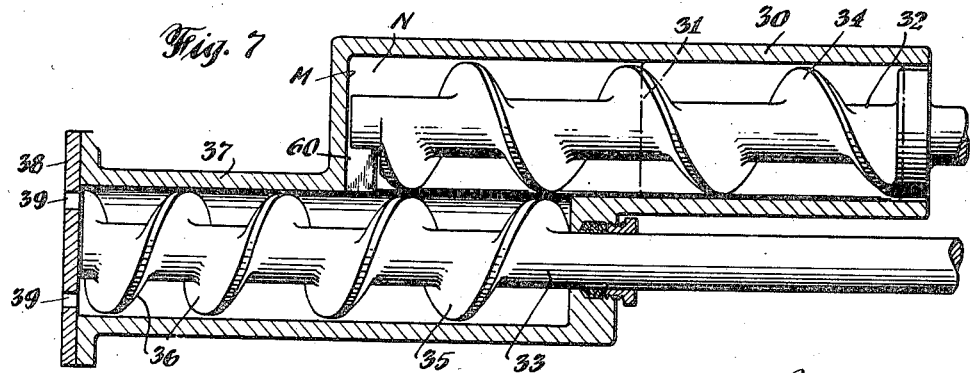
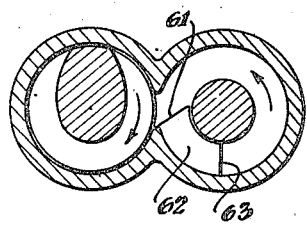
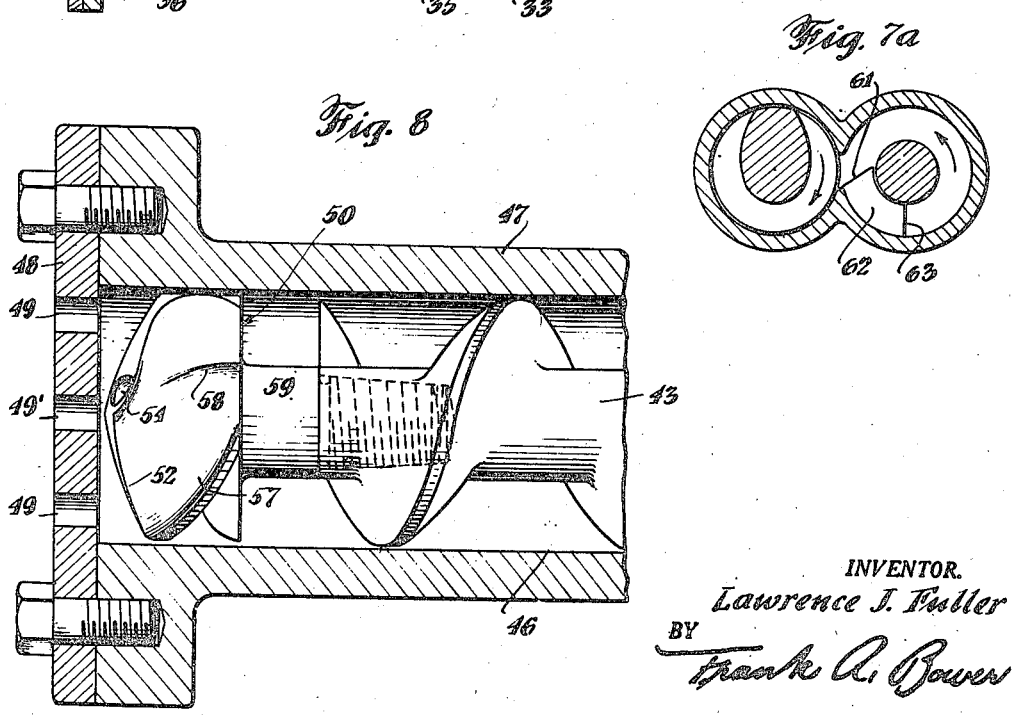
INVENTOR.
Lawrence J. Fuller
BY Frank A. Bower
ATTORNEY

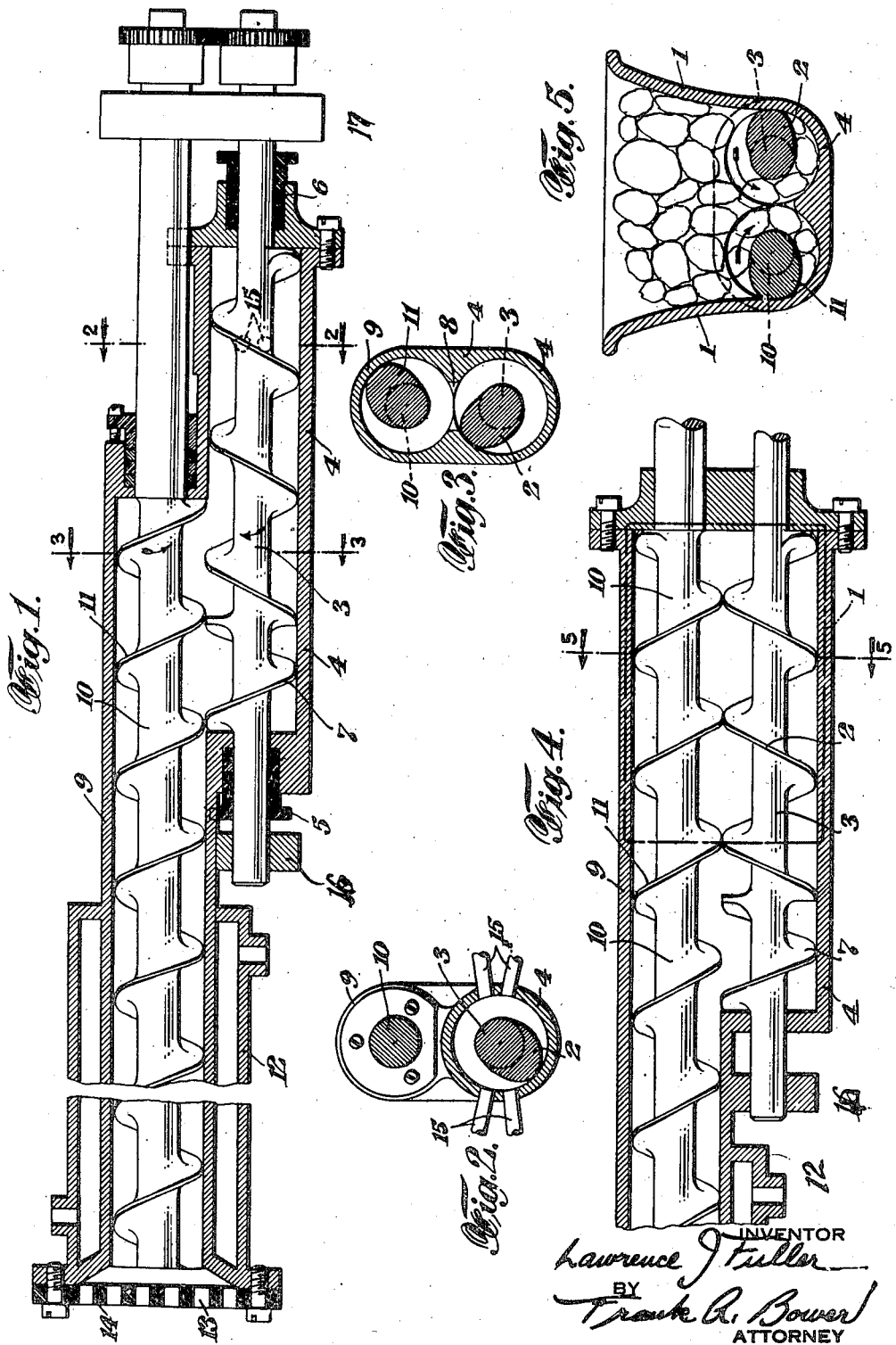

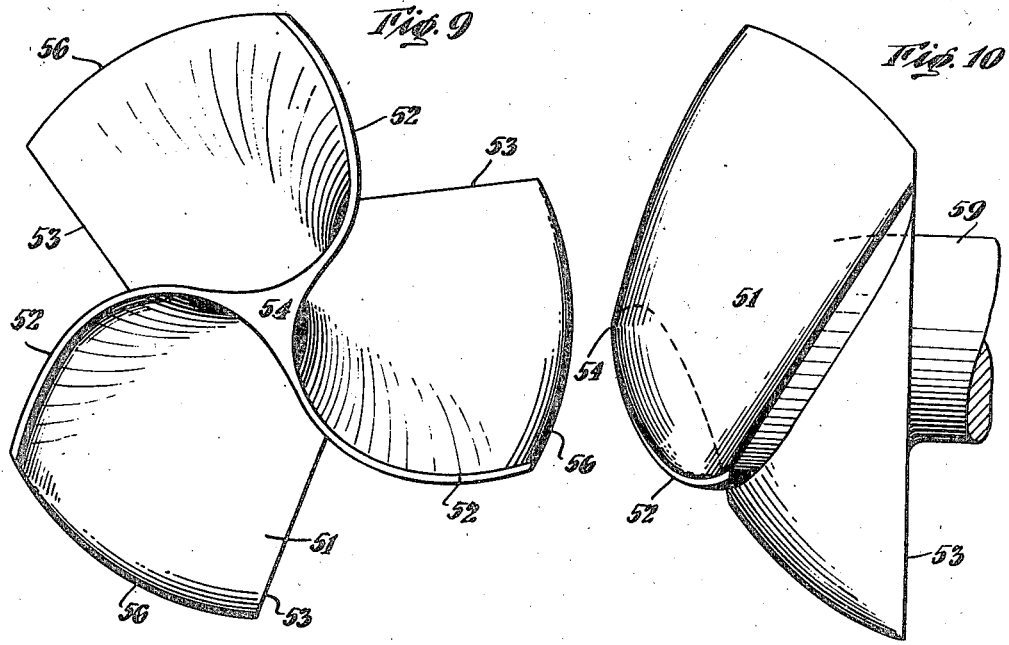
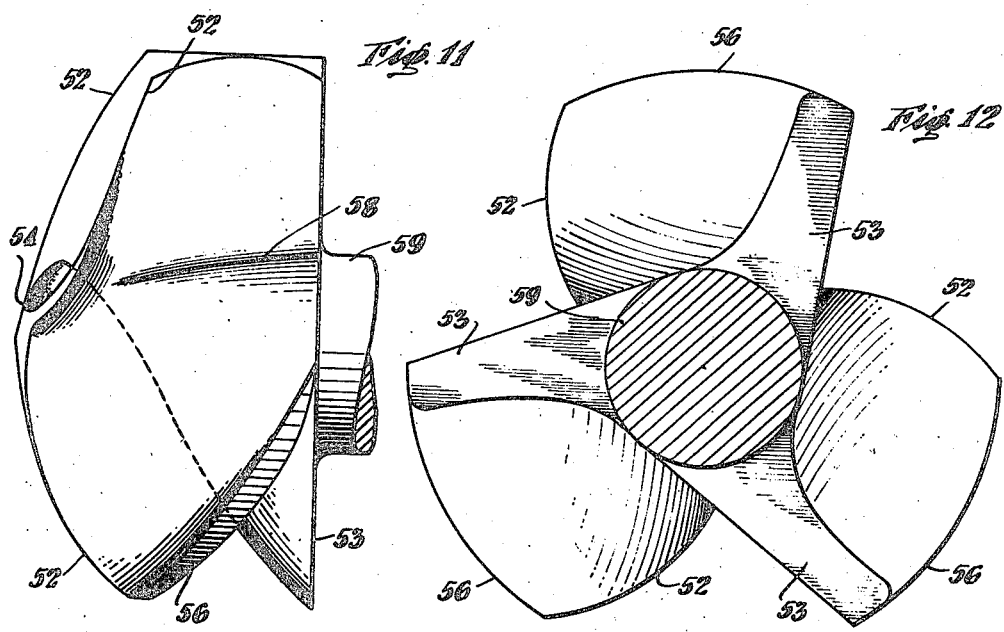

Patented May 11, 1948

2,441,222

UNITED STATES PATENT OFFICE 2,441,222

EXTRUDER

Lawrence J. Fuller, Philadelphia, Pa., assignor to Welding Engineers Incorporated, Philadelphia, Pa., a corporation of Delaware Application October 19, 1943, Serial No. 506,920

16 Claims. (Cl. 18—12)

My invention relates to worm type extruders and it is especially applicable to machines for extruding plastics.

It is the object of my invention to provide means for feeding an abundant supply of material under pressure by an extruder worm means so as to aid in maintaining a constant output under a high degree of pressure and with even distribution of the material over the face of the die.

My invention is illustrated in the annexed drawings in which

Fig. 1 is a vertical sectional view of an extruder embodying my invention;

Figs. 2 and 3 are cross sections along lines 2—2 and 3—3 respectively of Fig. 1;

Fig. 4 is a horizontal sectional view of a modification showing an alternative form of extruder in which the hopper feeds material directly to the main and auxiliary worms;

Fig. 5 is a cross section along line 5—5 of Fig. 4;

Figs. 6 and 7 show modified forms of extruders;

Fig. 7a is a cross section taken on line 7a—7a of Fig. 7;

Fig. 8 is a still further modification of the die end of the extruder apparatus including a special auxiliary terminal screw device;

Fig. 9 is a face view of the extruder terminal device as shown in Fig. 8;

Figs. 10 and 11 are side views of said extruder terminal device of Fig. 8; and

Fig. 12 is a rear view thereof.

In the extruder shown in Figs. 1, 2 and 3, plastic forming materials are introduced through pipes 15 into the right end of auxiliary worm barrel 4. When the ingredients become mixed the plastic is moved to the left by threads 2 of auxiliary worm shaft 3, and the material is then forced upwardly and into the receiving end of the threads 11 of the main worm shaft 10 by which it is forced onward to the die plate 14 or other extruding device.

The liquids introduced through pipes 15 may upon mixing coagulate into a plastic mass which is fed to the left by the threads 2 on worm shaft 3. Bearings 16 and 17 and packing 5 and 6 support worm shaft 3, and the left end of this shaft is equipped with a reverse flight 7. Auxiliary worm casing 4 communicates at 8 (Fig. 3) with casing 9 of main extruder worm 10. Threads 11 of this worm have a pitch opposite to that of threads 2, and the shaft is rotated in a direction opposite to that of auxiliary shaft 3 in order to assist in the transfer of material from the auxiliary feed to the extruder worm.

Rotation of shafts 3 and 10 produces an interaction between the main and auxiliary worms which subjects the plastic in casing 4 to pressure and forces it upwardly and into extruder casing 9. Such pressure is built up by reverse flight 7 which moves this material towards the right until it meets material being moved in the opposite direction by threads 2 of the auxiliary worm. The resulting opposed thrust of reverse flight and threads 2 creates a high degree of pressure on the plastic forcing it into the extruder casing, whence it is moved towards the left and extruded through openings 13 of the die plate 14. Since the auxiliary worm is placed below the main extruder, plastic in liquid form is prevented from entering the latter.

As illustrated in the drawings, an auxiliary worm having threads of opposite pitch to threads 11 of the extruder worm may be employed with the worms revolving in opposite directions so as to assist in drawing material into the extruder. Likewise the ends of threads 2 and 7 of the auxiliary worm may overlap slightly or may be separated by a small gap instead of terminating at the same point on the worm shaft as shown in Figs. 1 and 4.

The shafts 3 and 10 may be driven to rotate in the same direction, the pitch of the threads of one of the shafts being correspondingly altered, and such similar direction of rotation will aid in avoiding rotation of the material with the worms and so assist in the feed. Instead of pipes 15 a hopper may be used of the type shown in Fig. 5, the shaft 10 running through the hopper and within a protective tube if desired.

The worm feed of Figs. 1, 2 and 3 is also adapted for extraction of liquid from the material being fed. Such liquid separates out in the lower casing 4 due to the pressure of the feed and may be drained off through a strainer at the bottom or at any desired level. The rotation of the threads 2 carries their periphery over the strainer to continually wipe it clean and avoid clogging.

In the form shown in Figs. 4 and 5 lumps of plastic are fed first through hopper 1 directly to extruder worm 10 and auxiliary worm 3. The worms are placed side by side at the bottom of the hopper. With this arrangement it is preferable to employ worms of opposite pitch and to revolve them towards each other to draw the material into the worms and enable the worm threads to readily move the material axially.

Next, the plastic received by extruder worm 10 is moved toward the left and extruded. At the same time, threads 2 of the auxiliary worm move material from the hopper into casing 4 whence it is forced into the extruder casing with the aid of pressure created by the action of reverse flight 7 as described in connection with the extruder shown in Figs. 1, 2 and 3. In this manner the supply and pressure of material in the extruder worm are maintained at a maximum.

If desired the extruder worm casing may be provided with a jacket 12 for heating or cooling the plastic before it is extruded.

In the modification shown in Fig. 6 the casing 20 having the extension 27 carrying the extruding die plate 28 receives the material through the hopper opening 21 at the rear ends of the threads 24, 25 of the shafts 22, 23. These threads of the helices are shown as matched throughout the length of their cooperation, the end of the shorter thread 24 terminating clear of the end surface M of the casing, leaving a short space N for the movement of the material from the thread 24 to the thread 25. A wedge or plough block 60 is fixed in place in this space N as shown in Figs. 6, 7 and 7a, the flat inclined surface 61 of the block acting to direct the material rotating slightly with the worm (counter-clockwise, Fig. 7a) off to the left and between the threads 25, 35 of worm 23, 33. The rear surface 62 of the block 60 is tapered progressively to a sharp trailing edge at 63 so as to permit the material to fill in the space behind the block. Beyond this point the pitch of the thread 25 becomes progressively less, as indicated at 26, so as to advance the material at a slower rate as the pressure on the material increases approaching the die plate 28.

The die plate 28 is typically provided with outer openings 29 and inner openings 29' and is bolted in place at the end of the casing extension 37 as shown.

In the modified extruder shown in Fig. 7 the casing 30 with the extension 37 receives the material through the hopper opening 31 at the end of the screw shaft 32 having the thread 34, the end of which terminates somewhat short of the end surface M, leaving the space N for the block 60 shifting the material from the extruder screw 34 over to the threads 35 of the shaft 33. These extruder screws 34 and 35 overlap for a distance slightly greater than the full 360° pitch of the helix, and within this space and the space N the material picked up from the hopper is transferred from the threads 34 to the threads 35, these latter progressively decreasing in pitch as indicated at 36 so as to feed at a slower rate and compact the material at the area of pressure in advance of the die plate 38 provided with openings 39 around a radius greater than the radius of the screw shaft 33. Plough block 60 is positioned in this space N as explained previously.

While the shafts 22, 32 and 23, 33 are usually driven at substantially the same speed, the relative speeds may be different so as to continuously shift the point of delivery from one thread to the other.

Instead of matching threads 24, 34 with threads 25, 35, they may be offset or staggered (for instance, as indicated by threads 2 and 11 in Fig. 1) so that the material from threads 24, 34 is delivered to the back of the threads 25, 35, and this is often the preferred combination.

In the modification illustrated in Fig. 8 the shaft 43 carries the thread 46 and is housed in the casing extension 47 at the end of which is the die plate 48 having the outer die openings 49 and the central die openings 49'.

The shaft 43 and thread 46 terminate at a distance from the die plate 48 leaving a space within which is mounted the auxiliary extruder device 50 carried by and rotatable with the shaft 43.

The end extruder or propeller 50 comprises a bladed portion 51 and a hub portion 59. The front end of the bladed portion is positioned as close to the die plate 48 as is feasible while still avoiding variations due to impulses of the individual blades, the front blade edges 52 terminating centrally in an apex portion 54 at the extreme front end of the conical hub 58 extending forward from the rear hub portion 59. These front edges 52 of the blades curve backward from the apex 54 in side view, as illustrated in Figs. 8, 10 and 11, and as illustrated in Fig. 9 curve progressively backward in a direction opposite to the direction of rotation. Between the front edges 52 and the rear edges 53 of the blades the surfaces are cupped or hollowed out to provide for the progress of the material inward toward the apex 54. The peripheries 56 of the blades 51 are formed on cylindrical surfaces as indicated in Figs. 9 and 11 providing a substantially uniform clearance within the inner surface of the casing extension 47.

The formation of the blading of the extruder member 50 is such as to progressively increase the cross sectional area of the material as it approaches the die plate 48 while at the same time feeding the material inward toward the center and with increasing pressure over the whole cross section. The material is therefore evenly distributed over all of the die openings under substantially uniform pressure so that all of the die openings extrude the material at the same rate.

The shaft of the preliminary or auxiliary supply thread may be increased in diameter to reduce the volume within the barrel at the delivery end of the thread and so aid in forcing the material out into the extruding thread at the area of overlap. A bearing is not usually required at the die end of the extruder shaft which has two bearings at its other end. While in Figs. 6 and 7 the delivery end of the extruder thread is shown positioned close to the die, it is often preferred to leave an open space sufficient to permit consolidation of the material and a smoothing out of the impulses of the individual threads.

The combined action of the preliminary and delivery worms prevents clogging at the rear of the latter, and the main extruder thread is fed constantly and uniformly with the resultant steady flow and invariable pressure evenly distributed over the die face.

I claim:
1. In worm type extruder apparatus the combination with a main casing of impervious material and of generally cylindrical form having an extrusion opening adjacent one end thereof, of an auxiliary casing of impervious material and of generally cylindrical form alongside main casing and terminating short of one end thereof and intersecting said main casing at a longitudinal area of overlap, an inlet to said auxiliary casing at the end thereof remote from said extrusion opening, a lateral opening from said auxiliary casing into said main casing at said area of overlap to provide a common chamber for both casings of impervious material radially retaining pressure within the overlapping portions of said casings, an auxiliary feed worm in said auxiliary casing extending from said inlet to the opposite end of said auxiliary casing and receiving material from said inlet and feeding it axially of its corresponding casing at said area of overlap to the extent of at least 180° of the worm thread and laterally through said opening into said main casing, and a main extruder worm in said main casing receiving material through said lateral opening at said area of overlap and extending beyond said area to the extrusion opening and feeding the material axially of its casing in the same general direction of the said auxiliary worm, said extrusion opening of said main casing acting to develop a back pressure on the material being fed therethrough.

2. A worm type extruder apparatus as set forth in claim 1 in which the threads of both the main and auxiliary worms are of the same pitch at the area of overlap.

3. A worm type extruder apparatus as set forth in claim 1 in which the inlet supplies material to both the main and auxiliary worms from a single hopper and the material supplied to the auxiliary worm is merged with the material carried by the main worm at the area of overlap.

4. A worm type extruder apparatus as set forth in claim 1 in which the auxiliary worm at the area of overlap has a portion of its thread of opposite pitch tending to feed the material backward toward the inlet.

5. A worm type extruder apparatus as set forth in claim 1 in which the intake end of the main extruder worm is located in the common chamber for both casings so that the entire supply of material to the apparatus is received at the inlet to the auxiliary casing and transferred to the main extruder worm through the lateral opening.

6. A worm type extruder apparatus as set forth in claim 1 in which the intake end of the main extruder worm is located in the common chamber for both casings so that the entire supply of material to the apparatus is received at the inlet to the auxiliary casing and transferred to the main extruder worm through the lateral opening, and a guiding mechanism at the pressure end of the auxiliary feed worm diverts the auxiliary feed to the main worm at the discharge end of the area of overlap.

7. In a worm type extruder apparatus the combination with a hopper for the supply of material to the apparatus, of a plurality of material-moving worms having their entrance ends receiving material from said hopper, connecting parallel casings housing said worms and of impervious material of generally cylindrical form radially retaining pressure within said casings and having overlapping portions formed with a lateral opening between them to provide a common chamber for both casings of impervious material radially retaining pressure within said overlapping portions, said material-moving worms including a main extruder worm and an auxiliary feed worm parallel to each other adapted to rotate in opposite directions in said casings and oppositely threaded so as to feed material in the same direction and substantially adjacent and coextensive at the point of material intake so that the material is fed and drawn in between the worm threads by their combined action moving in the same direction, said main and auxiliary feed worms extending into said casings from said point of material supply to feed material from said supply axially into and along said casings and through said overlapping portions, said auxiliary worm and the casing housing the same terminating short of said main worm and the casing housing the same and transferring material from one casing to the other through said lateral opening in said region of communication, so that material may be worked between the worms for mixing, temperature rise and promotion of chemical action, plasticizing and the like, said casing housing said main worm having a discharge opening and means at the discharge end of the main worm developing a back pressure on the material being fed thereby.

8. A worm type extruder apparatus as set forth in claim 7 in which the main and auxiliary worms are rotated oppositely at the same speed and have their threads of similar pitch and of opposite hand and positioned to maintain the peripheries of said threads matched to run closely together at the area of overlap.

9. A worm type extruder apparatus as set forth in claim 7 in which the auxiliary feed worm is provided with a reverse flight at its discharge end transferring auxiliary feed material through the lateral opening to the feed of the main extruder worm.

10. A worm type extruder apparatus as set forth in claim 7 in which a guiding mechanism at the pressure end of the auxiliary feed worm diverts the auxiliary feed to the main worm at the discharge end of the area of overlap.

11. A worm type extruder apparatus comprising a retaining casing composed of a pair of adjacent parallel barrels of impervious material and of generally cylindrical form overlapping and in direct communication along a median plane within said casing to form a lateral opening between said barrels and provide a common chamber for both barrels of impervious material radially retaining pressure within the overlapping portions of said barrels, each barrel having an entrance end and a discharge end, a pair of feed worms with threads of opposite hand having entrance and discharge ends and rotatable in opposite directions in the said barrels and feeding material axially through their respective barrels and with their peripheries closely adjacent each other in the region of communication between said barrels within said casing, one of said worms and the barrel in which it rotates terminating short of the discharge end of the other worm and barrel, an inlet supplying material to the entrance ends of both of said barrels so that the material is fed and drawn in between the worms by their combined action moving in the same direction, and means opposing the axial feed of material by said worms comprising obstructing means at the discharge end of each worm developing back pressure against each feed and acting to permit the material to pass beyond the obstructing means under said pressure into an area of lower pressure.

12. A worm type extruder apparatus as set forth in claim 11 in which the barrels of the casing follow close to the peripheries of the feed worms to partially project between said peripheries at the region of communication between said barrels.

13. A worm type extruder apparatus as set forth in claim 11 in which the obstructing means developing back pressure against the feed includes a rotary means restricting the feeding of the material adjacent an opening discharging the material into an area of lower pressure.

14. A worm type extruder apparatus as set forth in claim 1 in which the main and auxiliary worm threads at the area of overlap are relatively staggered so that each of said threads at said area is always opposite the space between the threads of the other.

15. A worm type extruder apparatus as set forth in claim 1 in which following the discharge end of the main extruder worm there are additional, separate, relatively short extruder blades forming an extruder member passing the material onto the extrusion opening of the main casing.

16. A worm type extruder apparatus as set forth in claim 1 in which following the discharge end of the main extruder worm there are additional, separate, relatively short extruder blades forming an extruder member passing the material onto the extrusion opening of the main casing, said extruder member being spaced from the end of the main extruder worm.

LAWRENCE J. FULLER.

REFERENCES CITED

The following references are of record in the file of this patent:

UNITED STATES PATENTS

| Number | Name | Date |
|---|---|---|
| 1,069,546 | Guy et al. | Aug. 5, 1913 |
| 1,703,465 | Woodhead | Feb. 26, 1929 |
| 1,849,291 | Gordon | Mar. 15, 1932 |
| 1,990,655 | Loomis | Feb. 12, 1935 |
| 2,048,286 | Pease | July 21, 1936 |

OTHER REFERENCES

Ser. No. 286,038, Frei (A. P. C.), published April 27, 1943.